May 27, 1958     J. MORPHIS     2,836,144
GAUGE HEAD
Filed June 21, 1957

INVENTOR.
JEHU MORPHIS
BY
Raymond A. Paquin
ATTORNEY.

United States Patent Office 2,836,144
Patented May 27, 1958

2,836,144

GAUGE HEAD

Jehu Morphis, Garland, Tex., assignor to Leta S. Taylor, individually and as trustee for Douglas C. Taylor and Leta E. Taylor, a partnership Application June 21, 1957, Serial No. 667,254

2 Claims. (Cl. 116—129)

This invention relates to liquid level gauges and has particular reference to a new and improved indicating assemblage for use on existing gauges where a gauge is desired having a different scale than on the existing gauge.

An object of the invention is to provide a new and improved indicating assemblage of the type set forth which may be substituted for the indicating means or assemblage on an existing gauge, is relatively simple and economical in construction yet efficient in operation.

Another object is to provide a new and improved indicating assemblage of the type set forth which may be easily and quickly secured in operative position on an existing gauge or removed therefrom to adapt the existing gauge for use with a different scale.

Other objects and advantages of the invention will be apparent from the following description taken in connection with the accompanying drawings. It will be understood that changes may be made in the details of construction and arrangement of parts without departing from the spirit of the invention as set forth in the accompanying claims.

Referring to the drawings.

Figure 1:
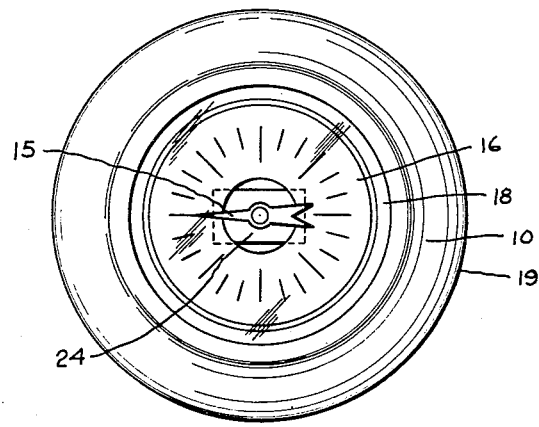
Fig. 1 is a top or plan view of a gauge head embodying the invention.
Figure 2:
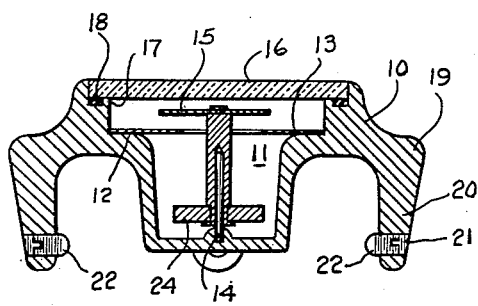
Fig. 2 is a longitudinal sectional view of the device shown in Fig. 1.
Figure 3:
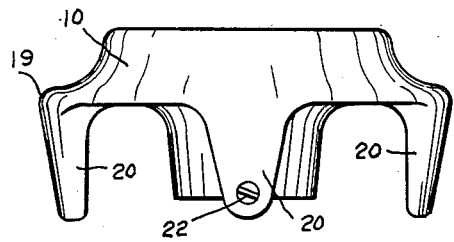
Fig. 3 is a side view thereof.

Referring more particularly to the drawings wherein similar reference characters designate corresponding parts throughout, there is shown a substitute indicator assemblage which is particularly adapted for use on magnetic type liquid level gauges, but which is adaptable to other types of gauges. The indicator assemblage shown comprises a cup shaped element or housing 10 having a central depression or recess 11 with a shoulder 12, on which is positioned the annular scale 13.

Within recess 11 is the pivot 14 on which is pivotally mounted the pointer or indicator 15 for indicating on the scale 13 the contents of the liquid tank.

The indicator assemblage is adapted for use over gauges of the type having a driving and a driven magnet means as shown in Patent No. 2,578,104 with the central portion of the element 10 adapted to extend into a depression or recess in the head of the gauge on which the indicator assemblage is employed.

The recess 11 is adapted to be closed by the cover glass 16 positioned on shoulder 17 and with the resilient seat 18 with the outer end of the element 10 being spun over or turned inwardly to retain the cover glass 16 in position on the element 10.

Figure 4:
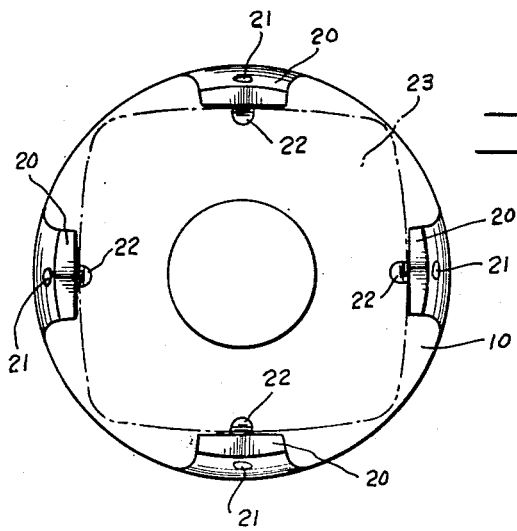
Fig. 4 is a bottom view thereof.

Adjacent the periphery of the element 10 is provided the integral flange 19 which may be a continuous flange but preferably provides the spaced depending finger portions 20 as shown and these depending finger portions 20 have threaded openings 21 in which are positioned the set screws 22 adapted to engage the sides of a head 23, which head is shown in broken lines in Fig. 4.

It will be seen that by positioning the indicator assemblage over the head of a gauge and tightening the set screws 22, the indicator assemblage will be locked in operative position and the magnet 24, which is operatively connected to the pivot 14, is adapted to be rotated upon rotation of a similar magnet in a gauge head, as shown in the patent referred to above, and such pivotal movement of magnet 24 will effect pivotal movement of the pointer 15 on scale 13 to indicate the contents of the liquid tank.

From the foregoing it will be seen that I have provided new and improved means for obtaining all of the objects and advantages of the invention.

I claim:

1. An indicator assemblage for a magnetic liquid level gauge comprising, a housing having a central stepped depression, an annular scale in the upper portion of said depression, a pivoted pointer in said depression above said scale, a pivot for said pointer in the lower portion of said depression, a magnet operatively connected to said pointer adjacent the bottom of said depression and a depending peripheral means spaced from said depression of said housing and adapted to embrace the upper end of a head of a gauge, said peripheral means comprising a plurality of spaced fingers and means for securing said fingers to the head of a gauge comprising a plurality of spaced set screws extending through said fingers and adapted to engage the head of the gauge on which the indicator assemblage is positioned.

2. An indicator assemblage for a liquid level gauge of the type having a driving and a driven magnet in which a pointer is positioned by the driven magnet, said indicator assemblage head comprising a hollow housing including a transparent closure and having a depressed portion dimensioned to extend into the housing of a gauge to a position adjacent the driving magnet of such gauge, a pivot centrally located in said depressed portion, a driven magnet mounted on said pivot adjacent the bottom of said depressed portion, an indicating pointer mounted on said driven magnet to be visible through said transparent closure and a dial positioned in said housing having graduations calibrated with respect to movements of said pointer, securing means integrally formed with said housing radially spaced from said depressed portion so as to embrace the housing of the gauge head, said securing means including set screws to contact the outer surface of said gauge head.

References Cited in the file of this patent

UNITED STATES PATENTS

| 2,300,614 | Connolly | Nov. 3, 1942 |
| 2,584,446 | Hastings | Feb. 5, 1952 |
| 2,620,412 | Ford | Dec. 2, 1952 |